UNITED STATES PATENT OFFICE.

CHARLES C. PARSONS, OF NEW YORK, N. Y.

IMPROVED PROCESS OF PURIFYING PETROLEUM.

Specification forming part of Letters Patent No. 88,978, dated April 13, 1869.

*To all whom it may concern:*

Be it known that I, CHARLES C. PARSONS, of New York, in the county and State of New York, have invented a new and Improved Process for Purifying Petroleum and other Hydrocarbons; and I do hereby declare that the following is a full and exact description of the same, sufficient to enable others skilled in the art to practice it.

The invention consists in passing the vapors of the petroleum or other hydrocarbon, while the atmospheric pressure is removed, through a suitable vessel containing either carbonaceous matter or metallic oxides, or both combined.

Various attempts have been made to purify hydrocarbons in the vaporous condition; but they have all failed, from the fact that the purifying substance produces pressure in the still, and this causes overheating and consequent decomposition and discoloration of the hydrocarbons.

By exhausting the vapors by an air-pump or other suitable means, so placed that the vessel containing the purifying material shall be between it and the still, the vapors are drawn through the purifying material without any increase of pressure, thus at a low temperature, and without the injury resulting from overheating.

I have not described any special form of apparatus, as any one form would need more or less alteration in adapting it to stills now in use; and there are several forms that have been used for other but similar purposes which could be easily fitted for this purpose, and which are well known.

For a purifying material I prefer, for ordinary petroleum, either wood or animal charcoal, in as fine a state of division as will permit the free passage of the vapors.

When the hydrocarbons contain sulphur or other specially deleterious substances, oxide of iron, calcium, or other metals may be used, either by themselves or in combination with the charcoal.

The vessel containing the purifying material should be placed as near the still as possible, to prevent loss by condensation, and it should be so arranged that any liquid condensed in it shall not be carried into the receiver with the purified distillate.

I prefer to distill the hydrocarbon to be purified in this way by superheated steam, as direct exposure to fire will so affect the oils as to prevent the successful operation of my process.

I do not claim the general use of the materials above described for purifying hydrocarbons in the vaporous condition.

What I claim as my invention, and desire to secure by Letters Patent, is—

The process of purifying hydrocarbons by passing their vapors through purifying materials, arranged and composed substantially as described, while the said hydrocarbons are being distilled in a vacuum, and by superheated steam.

CHARLES C. PARSONS.

Witnesses:
   LISTON W. BARQUET,
   WM. J. PARSONS.